United States Patent Office 2,802,009
Patented Aug. 6, 1957

2,802,009

1,5-DIHYDROXY-2-PYRIDONES, INTERMEDIATES AND PROCESS

Niels K. F. W. Clauson-Kaas, Haifa, Israel, and Niels Elming and Jorgen Tormod Nielsen, Copenhagen, Denmark, assignors to A/S Sadolin & Holmblad, Copenhagen, Denmark No Drawing. Application February 15, 1955, Serial No. 488,408

7 Claims. (Cl. 260—297)

This invention relates to, and has for its object the provision of, certain cyclic hydroxamic acids of the pyridine series, and a method of preparing them.

Prior to this invention, the cyclic hydroxamic acid

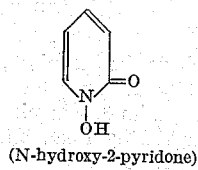

(N-hydroxy-2-pyridone)

had been prepared from 2-bromo pyridine, and found to have antibacterial activity comparing favorably with the antibiotic aspergillic acid (U. S. Patent No. 2,540,218, dated February 6, 1951). The process employed for the preparation of that compound, however, did not lend itself to the commercially feasible preparation of advantageous derivatives of N-hydroxy-2-pyridone.

The compounds of this invention are those of the general formula

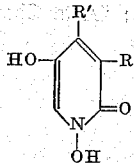

wherein R and R' are each a member of the group consisting of H and lower alkyl (preferably H). These compounds have qualitatively the same antibacterial action as N-hydroxy-2-pyridone, and are used for the same purposes and in the same manner as the latter (with the concentration or dosage adjusted in accordance with relative activity). Thus, they may be used in the treatment of animals infected with organisms sensitive to N-hydroxy-2-pyridone; or they may be used to remove susceptible microorganisms from instruments and equipment, or in separating certain species of microorganisms from mixtures thereof with susceptible microorganisms.

As in the case of N-hydroxy-2-pyridone, the compounds of this invention may be in tautomeric equilibrium with the corresponding N-oxides, e. g.

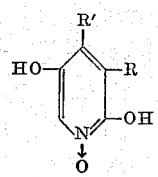

and it is intended that this N-oxide form be included when the N-hydroxy compound is named or shown hereinafter.

The compounds of this invention are readily prepared by reacting hydroxylamine with a substituted 2,5-dihydrofurfural of the formula

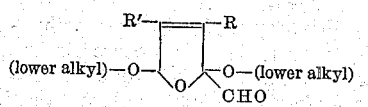

wherein R and R' have the meaning given hereinbefore [or a readily hydrolyzable derivative of the hydrate form of the aldehyde, such as the di-ester (especially of the lower fatty acids, such as acetic and propionic)], and hydrolyzing and condensing the reaction product by treatment with an aqueous mineral acid. Preferably, the reaction with hydroxylamine is effected in methanol.

The reaction with hydroxylamine probably proceeds through the oxime of the general formula

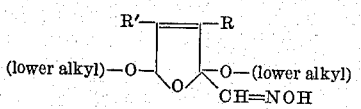

The preferred starting materials for the purpose of this invention are the 2,5-dimethoxy-3-R-4-R'-2,5-dihydrofurfurals or readily hydrolyzable derivatives thereof; but corresponding reactants with other (lower alkyl)-oxy substituents may be employed, these being obtained by employing ethanol, propanol, etc. in place of methanol in the alkoxylation of the 3-R-4-R'-furfural diacetate.

The following examples are illustrative of the invention:

*Example 1*

500 mg. (0.0019 mole) of 2,5-dimethoxy-2-diacetoxymethyl-2,5-dihydrofuran [Acta Chemica Scandinavica 1 (1947), 415–421] is dissolved in 2.0 ml. methanol, and the solution is added to a solution of sodium methoxide prepared from 44 mg. sodium (0.0019 mole) and 1.0 ml. methanol. After standing for 15 minutes, a solution of 0.16 g. (0.0023 ml.) of hydroxylamine hydrochloride and 0.050 g. anhydrous sodium acetate in 2.0 ml. methanol is added; and the mixture is left standing for 20 minutes, and the precipitated (sodium chloride) is removed by filtration. The almost colorless filtrate is heated under reflux for 8 minutes, and then evaporated in vacuo to about 1 ml. (on a water bath at 30–40° C.). Then 1 ml. water and 2.5 ml. hydrochloric acid are added, and the solution is left standing for 10 minutes. The product (1,5-dihydroxy-2-pyridone) is precipitated as white crystals, which are removed by filtration, washed with water, then ethanol and ether. The yield is about 164 mg. (about 68%); and the product melts at about 216–225° C. (in an evacuated tube with decomposition). Crystallization from ethanol yields about 138 mg. (about 57%), melting at about 215–223° C. The product gives a strong violet ferric chloride reaction. Its analysis for carbon, hydrogen and nitrogen is in agreement with that calculated for $C_5H_5O_3N$.

*Example 2*

Replacement of 2,5-dimethoxy-2-diacetoxymethyl-2,5-dihydrofuran in Example 1 by an equimolar amount of 2,5-dimethoxy-2,5-dihydrofurfural gives practically the same percentage yield of 1,5-dihydroxy-2-pyridone.

The 2,5-dimethoxy-2,5-dihydrofurfural may be obtained from the diacetate employed in Example 1, as follows:

3.0 g. of the diacetate is dissolved in 10 ml. methanol, and the solution is added to a solution of sodium methoxide (from 0.266 g. of sodium in 15 ml. methanol). After standing for about 15 minutes the methanol and the methyl acetate formed by the reaction are distilled off in vacuo. 50 ml. ether is added to the residue, the precipitated sodium acetate is removed by filtration and the ethereal solution is distilled, yielding the product as a colorless liquid boiling at about 88° (10 mm.).

Example 3

Replacement of the 2,5-dimethoxy-2-diacetoxymethyl-2,5-dihydrofuran employed in Example 1 by an equimolar amount of 2,5-dimethoxy-2-diacetoxymethyl-2,5-dihydro-3-methylfuran yields 3-methyl-1,5-dihydroxy-2-pyridone.

The 2,5 - dimethoxy - 2 - diacetoxymethyl - 2,5 - dihydro-3-methylfuran reactant is prepared by methoxylation of the diacetate of 3-methyl furfural in the manner described for furfural diacetate in Acta Chemica Scandinavica 1 (1947), 415–421.

Similar use of other 3 and/or 4 lower alkyl substituted furfurals (inter alia, 3,4-dimethyl, 4-isopropyl and 4-tertiary butyl furfural), yields the correspondingly substituted 1,5-dihydroxy-2-pyridones (inter alia: 3,4-dimethyl 1,5 - dihydroxy - 2 - pyridone; 4 - isopropyl - 1,5 - dihydroxy-2-pyridone; and 4-tertiary butyl-1,5-dihydroxy-2-pyridone).

The 1,5-dihydroxy-2-pyridones thus obtained may be converted to the corresponding 5-hydroxy-2-piperidones as illustrated hereinafter: 0.47 g. 1,5-dihydroxy-2-pyridone and 25 ml. methanol are shaken for 1 hour with 0.2 g. Raney nickel under hydrogen (100 atmospheres, 100° C.). The Raney nickel is removed by filtration, and the filtrate evaporated in vacuo. The crystalline residue is crystallized from methanol ether, yielding about 0.29 g. (about 68%) of the known 5-hydroxy-2-piperidone, as almost colorless crystals melting at about 144–146° C., analyzing for $C_5H_9O_2N$ [cf. Ber. 40 (1907) 301; and Ber. 32 (1899) 2682].

The invention may be variously otherwise embodied within the scope of the appended claims.

We claim:
1. A compound of the general formula

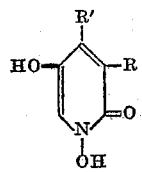

wherein R and R' are each a member of the group consisting of H and lower alkyl.

2. 1,5-dihydroxy-2-pyridone.

3. The method of preparing compounds of the general formula

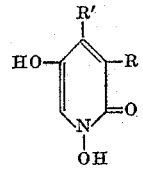

wherein R and R' are each a member of the group consisting of H and lower alkyl, which comprises reacting hydroxylamine with a compound of the general formula

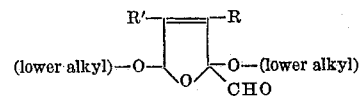

wherein R and R' have the meaning given hereinbefore, and hydrolyzing and condensing the reaction product.

4. The method of claim 3, wherein the hydrolysis and condensation is effected by treatment with an aqueous mineral acid.

5. The method of claim 4, wherein the reaction with hydroxylamine is effected in methanol.

6. 2,5-dimethoxy-2,5-dihydrofurfural.

7. 2,5-di(lower alkoxy)-2,5-dihydrofurfural.

References Cited in the file of this patent

Clauson-Kaas et al.: Acta Chem. Scand., vol. 1, page 419 (1947).

Fakstorp et al.: J. Am. Chem. Soc., 869–74 (1950).

Clauson-Kaas et al.: "Acta Chem. Scand.," vol. 6, p. 552 (1952).